A. T. BROWN.
TRANSMISSION GEARING FOR MOTOR AGRICULTURAL MACHINES.
APPLICATION FILED SEPT. 19, 1914.

1,234,863.

Patented July 31, 1917.
5 SHEETS—SHEET 1.

WITNESSES:

Alexander T. Brown INVENTOR.

BY
ATTORNEYS.

A. T. BROWN.
TRANSMISSION GEARING FOR MOTOR AGRICULTURAL MACHINES.
APPLICATION FILED SEPT. 19, 1914.

1,234,863.

Patented July 31, 1917.
5 SHEETS—SHEET 4.

WITNESSES:

Alexander T. Brown INVENTOR.
BY
Parsons & Bodell
ATTORNEYS.

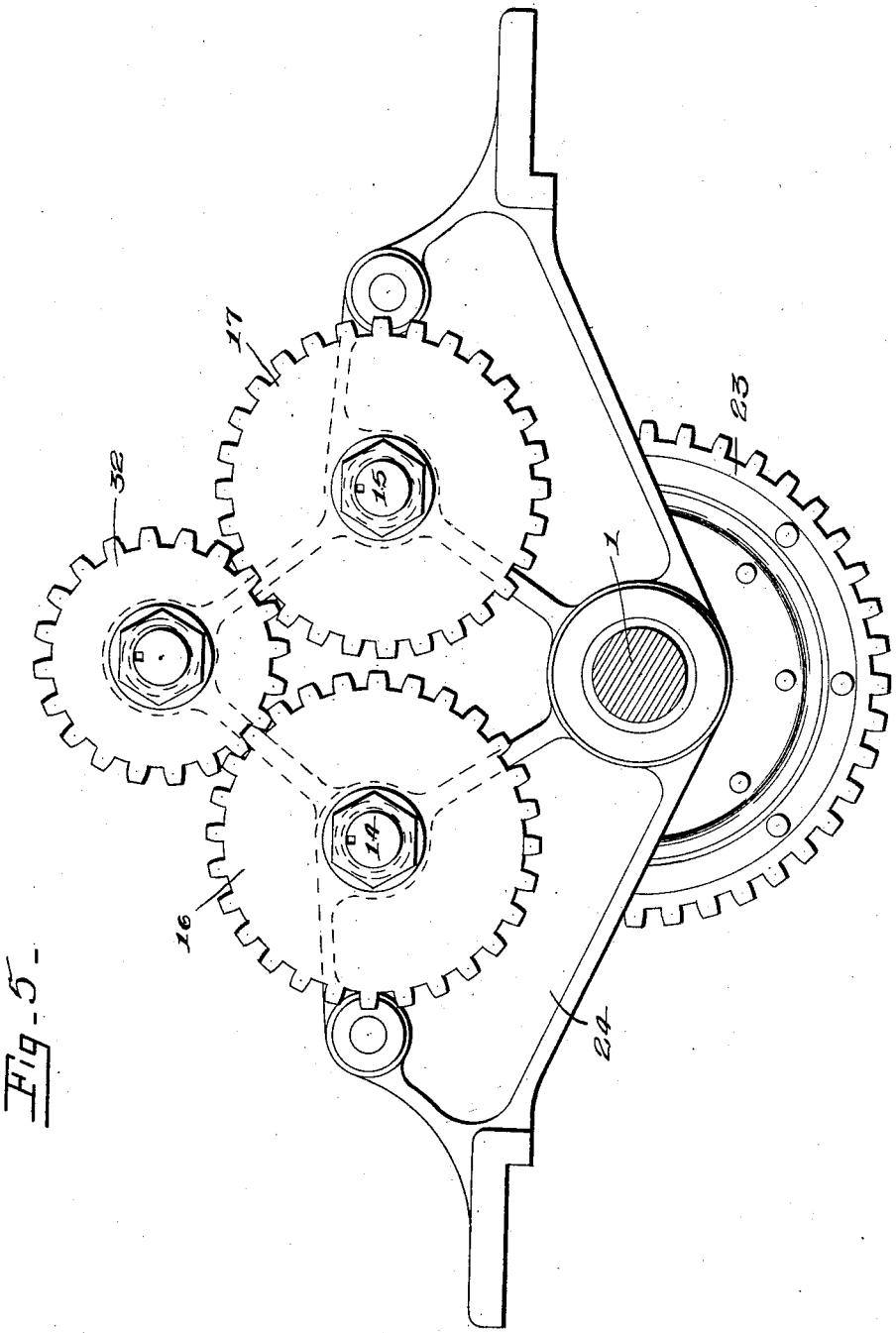

UNITED STATES PATENT OFFICE.

ALEXANDER T. BROWN, OF SYRACUSE, NEW YORK.

TRANSMISSION-GEARING FOR MOTOR AGRICULTURAL MACHINES.

1,234,863.

Specification of Letters Patent.

Patented July 31, 1917.

Application filed September 19, 1914. Serial No. 862,602.

*To all whom it may concern:*

Be it known that I, ALEXANDER T. BROWN, a citizen of the United States, and a resident of Syracuse, in the county of Onondaga and State of New York, have invented a certain new and useful Transmission-Gearing for Motor Agricultural Machines, of which the following is a specification.

This invention has for its object the production of a transmission gearing particularly applicable for a motor agricultural machine, whereby the machine can be turned for positioning the implements thereof in proper relation to the work, as plowing or mowing, etc., to be performed; and the invention consists in the novel combinations and constructions hereinafter set forth and claimed.

In describing this invention, reference is had to the accompanying drawings, in which like characters designate corresponding parts in all the views.

Fig. 5 is a view illustrating another arrangement of some of the gears of the gearing.

Figure 1:
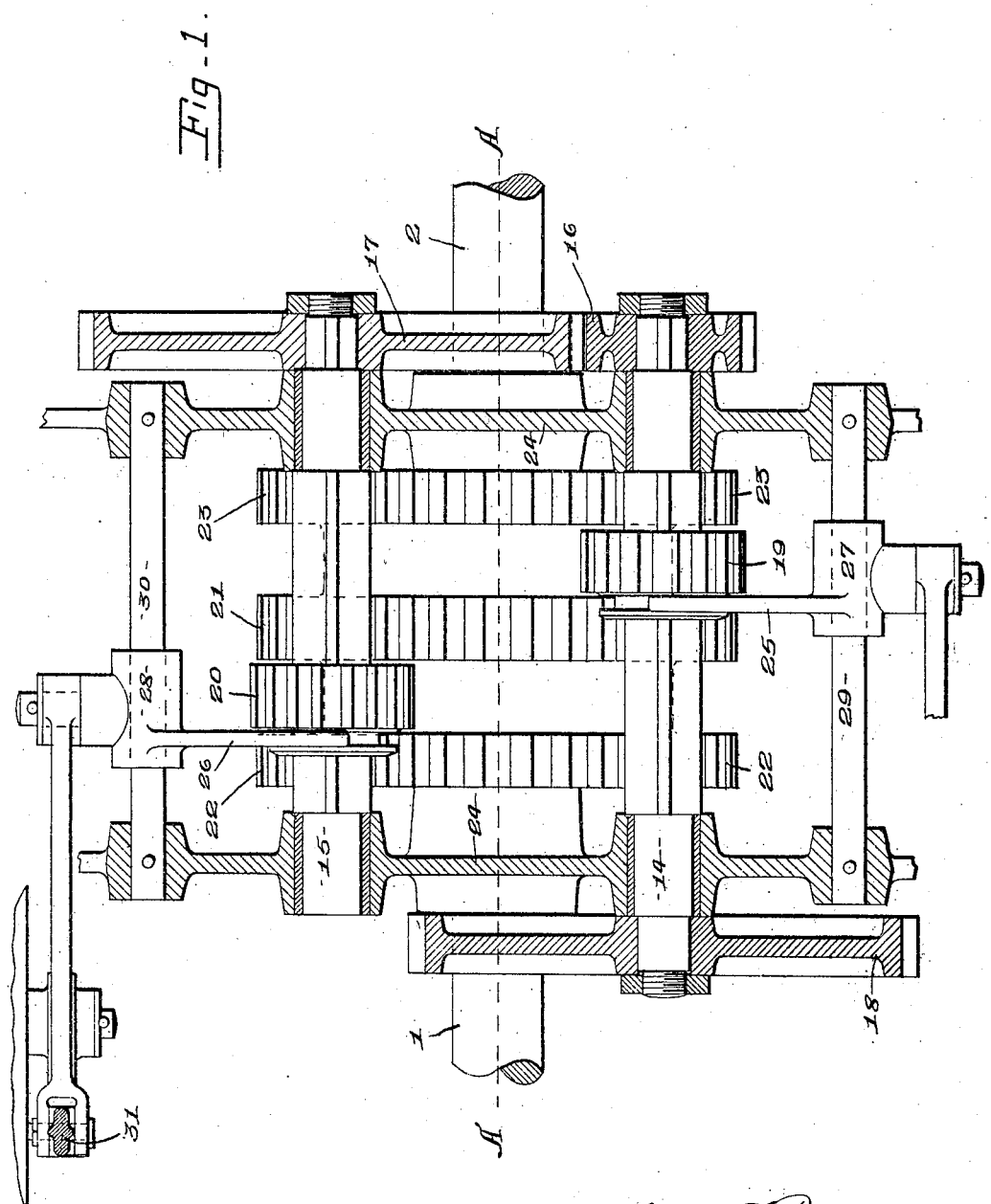
Figure 1 is a plan view, partly in section, of a preferable embodiment of my invention.
Figure 2:
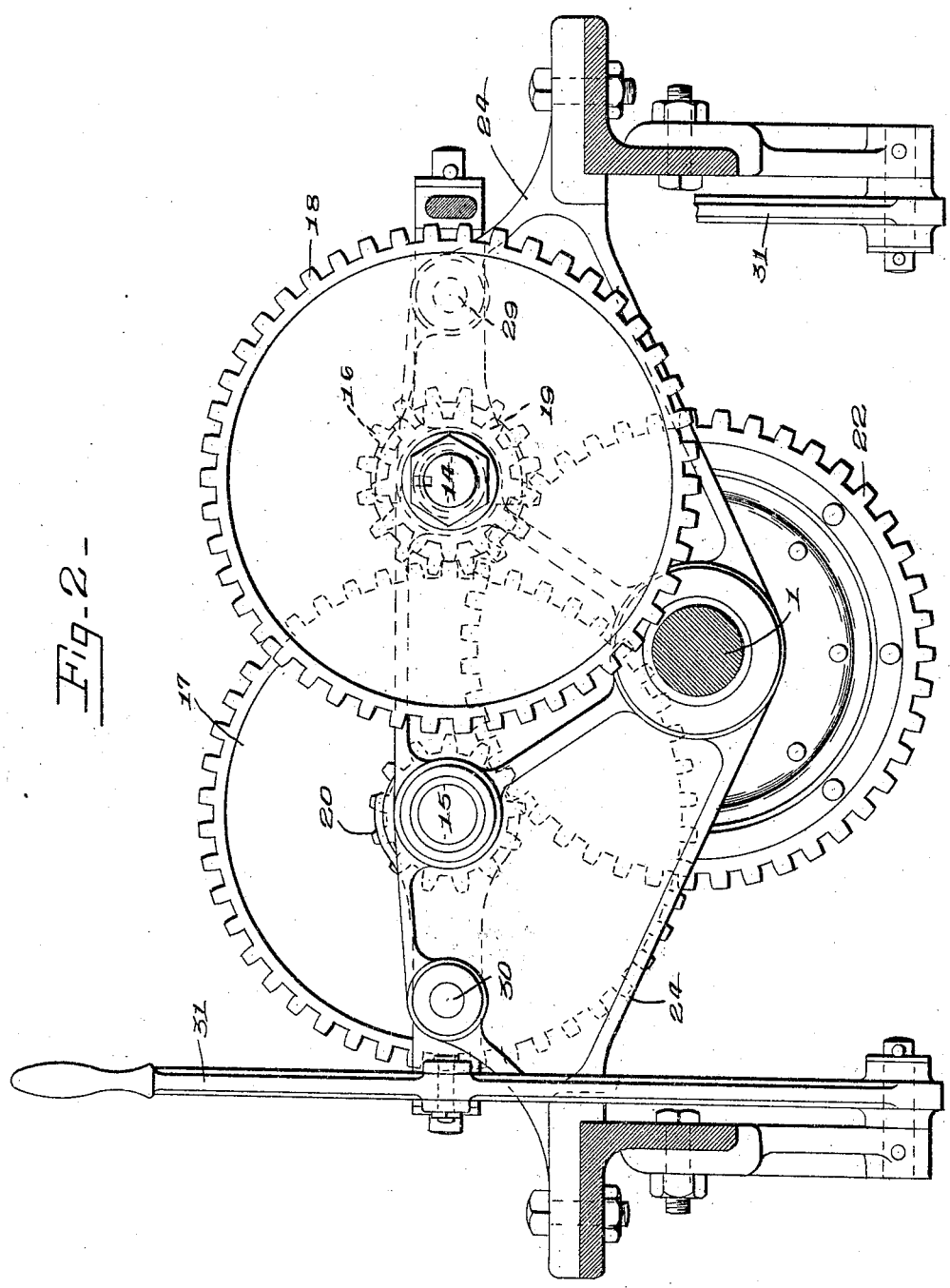
Fig. 2 is an end elevation of parts seen in Fig. 1.
Figure 3:
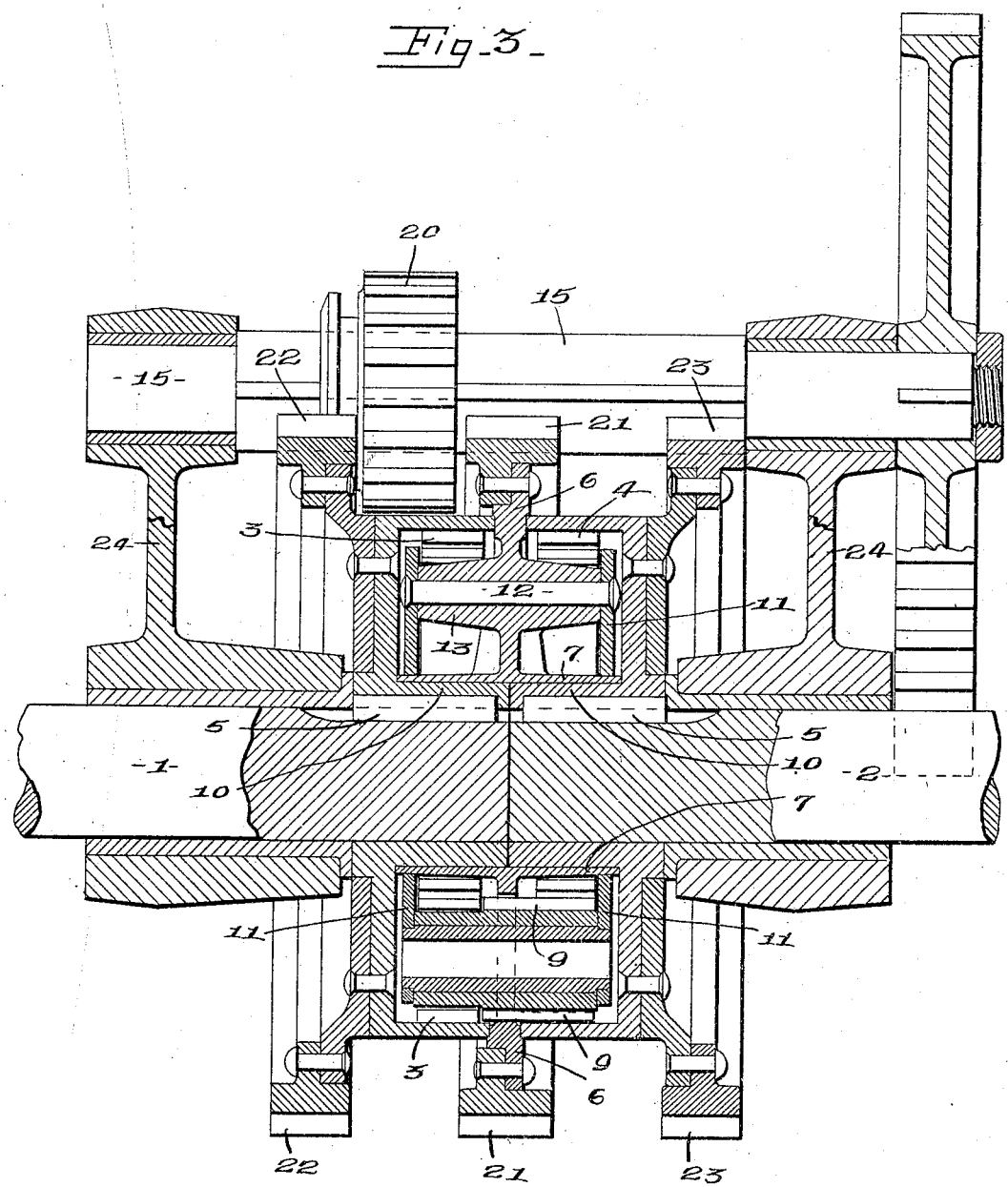
Fig. 3 is an enlarged sectional view on line A—A, Fig. 1.
Figure 4:
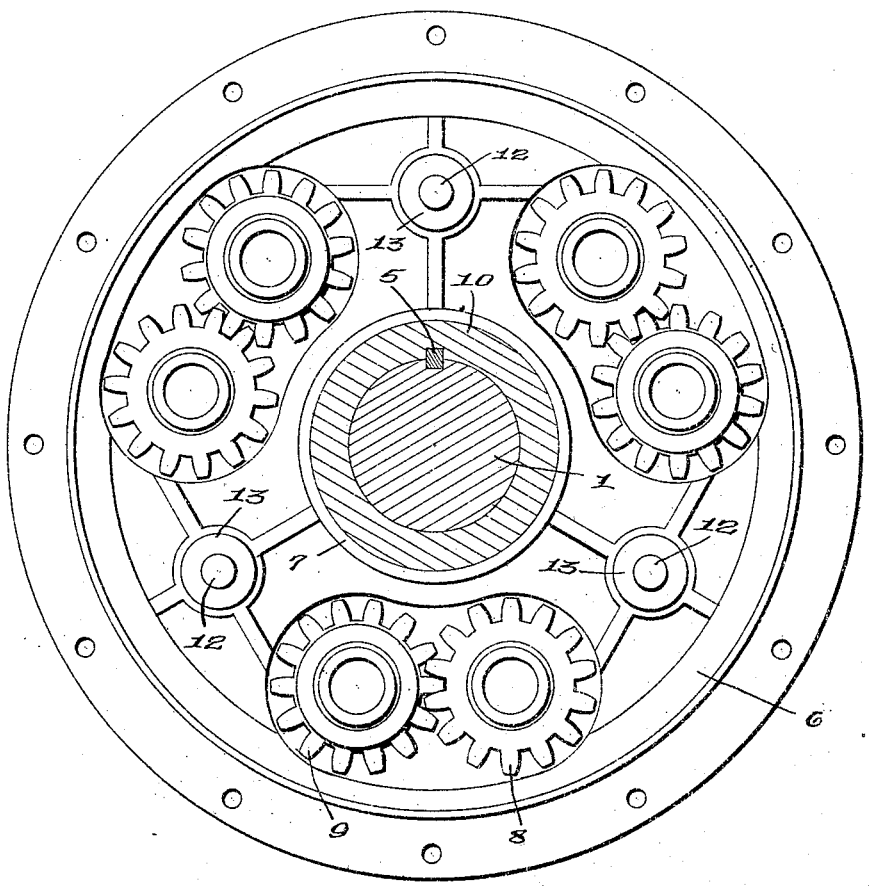
Fig. 4 is a detail view of the driving element.

This gearing comprises, generally, opposing shaft sections, gears fixedly mounted on the shaft sections and opposed to each other, a driving element loosely mounted with respect to the shaft sections and between the opposing gears and having planetary gears meshing with the opposing gears, a main drive shaft, and means for connecting the drive shaft to the driving element, or to either or both of the shaft sections.

In other words, the gearing comprises shaft sections, a differential gearing between the shaft sections, and means for actuating the shaft sections independently of the differential gearing.

1 and 2 are the opposing shaft sections.

3 and 4 are the opposing gears mounted on the shaft sections 1 and 2, and connected thereto by keys 5, the gears 3 and 4 being here shown as internal gears.

6 is the driving element including a body having a hub 7 loosely mounted on, or relatively to, the opposing ends of the shaft sections 1 and 2, and here shown as loosely mounted on the hubs 10 of the opposing gears 3, 4. 8 and 9 are planetary gears forming part of the driving element 6 and meshing with the gears 3, 4, respectively, and with each other, the gears 3, 4, and the driving element 6, with its gears 8, 9, being a differential or equalizing gear of the spur gear type. Any other type of differential gear may be employed.

The axles of the planetary pinions 8, 9, are journaled in opposing plates or cheek pieces 11, which are secured in position to the body of the element 6 by fastening members 12, extending through laterally extending bosses 13, formed on the body of the driving element 6, the ends of the bosses bearing against the inner sides of the cheek pieces.

The means for actuating the driving element 6, or either shaft section 1, 2, is constructed to drive the element 6 in opposite directions, or to drive either of the shaft sections 1, 2, in opposite directions, or either shaft section forwardly, while the other is being driven rearwardly, or to actuate the driving element 6 in one direction, while either one of the shaft sections 2 is being driven in the opposite direction.

The driving mechanism comprises shafts 14, 15, extending parallel to the shafts 1, 2, and connected together by means of intermeshing gears 16, 17, mounted, respectively, on said shafts, the gears 16 and 17 causing the shaft 15 to rotate opposite to the shaft 14, and, if desired, usually at a different rate of speed. The shaft 14 also has an additional gear 18 thereon which is connected to a suitable motor, not shown. The shafts 14, 15 may be connected to the shaft sections 1, 2, or to the driving element by means of members as pinions 19 and 20, mounted thereon, and shiftable independently of each other into and out of mesh with gears 21, 22, 23, connected, respectively, to the driving element 6 and to the shaft sections 1, 2.

The gears 22 and 23, are fixed to the opposing gears 3, 4, respectively. The gears 21, 22, 23 are all of the same size, and the pinions 19 and 20 are of the same size, so as to mesh with any one of said three gears.

The shaft sections and the driving shafts 14, 15, are supported in a suitable frame 24, and the shifting of the pinions 19 and 20, is effected by means of forks 25, 26, carried by sleeves 27 and 28, slidable along guide rods 29, 30, supported by the frame 24, the sleeves 27, and 28 being operated by suitable levers, as the lever 31.

This gearing, as before stated, is applicable for agricultural machines, as plows, mowers, etc., and is designed to turn the machine after the plows have turned furrows in one direction across the field, or the mower has cut a swath, into position to arrange the implement to turn the next furrow, or cut the next swath, as the case may be. In other words, the gearing is designed to steer and position the machine with respect to its work.

In operation, when the machine is to be run ahead, the pinion 19 is meshed with the gear 21 connected to the driving element 6, or to be backed up, the gear 20 is shifted into mesh with the gear 21 as the shaft 15 runs in reverse direction to that of the shaft 14.

For making a short turn, as for example, to the right about a vertical axis located in one of the ground wheels of the machine, which wheels are connected to the shaft sections 1, 2, the gear 19 is shifted into engagement with the gear 22, so that the machine will turn about a vertical axis extending through the point where the ground wheel connected to the shaft section 2 engages the ground.

To make a shorter turn to the right, the gear 19 is shifted to engage the gear 22, and the pinion 20 shifted into engagement with the gear 23 so that the gear 23 is rotated in a retrograde direction at less speed than the gear 22 and shaft section 1, is turned in a forward direction. Hence, the machine will be turned about an axis located between its center, and the ground wheel on the right side thereof. The position of this center can be determined by adjusting the ratio of gearing between the drive shafts 14, 15. In making turns to the left, the reverse of these operations takes place.

If the pinion 19 is shifted to mesh with the gear 21 and the pinion 20 into mesh with the gear 23, a longer turn will be obtained as the gear 22 will receive forward movement from the pinions 8, 9, in addition to the driving movement obtained from the element 6.

In some machines, it might be desirable to rotate the shafts 14 and 15 in the same direction at different speeds, so as to turn the machine about axes located outside of the ground wheels, and in such case the gears 16, 17 are connected so that they rotate in the same direction as by interpositioning an idler 32 between them, as shown in Fig. 5.

What I claim is:

1. In a transmission gearing, opposing shaft sections, actuating means for the shaft sections including members shiftable into position to actuate the shaft sections as a unit, said members being also shiftable into positions to actuate one shaft section independently of the other, and also shiftable into positions to actuate one section forwardly and the other rearwardly, substantially as and for the purpose set forth.

2. A transmission gearing including opposing shaft sections, gears fixedly mounted thereon and opposed to each other, a driving element having planetary gears meshing with the opposing gears, actuating means including forward and rearward actuating elements having members associated therewith and operable to be connected to the driving element and to the opposing shaft sections respectively, substantially as and for the purpose specified.

3. A transmission gearing comprising opposing shaft sections, gears fixedly mounted on the shaft sections and being opposed to each other, a driving element loosely mounted on the shaft sections between the opposing gears, and having planetary pinions meshing with the opposing gears, a pair of shafts arranged parallel to the shaft sections and connected to rotate simultaneously and means by which either of said shafts may be connected to the driving element, or one shaft connected to one of the opposing gears, and the other connected to the other of the opposing gears, or to the driving element, substantially as and for the purpose specified.

4. A transmission gearing comprising opposing shaft sections, gears fixedly mounted on the shaft sections and opposed to each other, a driving element loosely mounted on the shaft sections between the opposing gears and having planetary gears meshing with the opposing gears, a pair of driving shafts connected to rotate at different speeds, and means for connecting either driving shaft to the driving element, or to either of said opposing gears, or for connecting one drive shaft to the driving element, and the other drive shaft to either one of the opposing gears, or for connecting one drive shaft to one of the opposing gears, and the other drive shaft to the other of said opposing gears, substantially as and for the purpose set forth.

5. A transmission gearing comprising opposing shaft sections, gears fixedly mounted on the shaft sections to rotate therewith, a driving element common to both sections and interposed between the opposing gears and having planetary gears meshing with the opposing gears, three gears fixed, respectively, to the shaft sections, and to the driving element, driving shafts extending parallel to the shaft sections and connected to rotate simultaneously, and shiftable pinions mounted on the drive shafts, each being shiftable into and out of connection with any one of said three gears, substantially as and for the purpose described.

6. In a transmission gearing, opposing shaft sections, actuating means for the shaft sections including shiftable members, one being operable to be connected to both shaft sections whereby said sections are actuated as a unit and both members being operable into connection with the shaft sections so that said sections are operated in the same direction at different speeds, each one of said members being also shiftable into position so that one shaft section is rotated independently of the other and both members being further operable to actuate one shaft section forwardly and the other rearwardly, substantially as and for the purpose described.

In testimony whereof, I have hereunto signed my name in the presence of two attesting witnesses, at Syracuse, in the county of Onondaga, and State of New York, this 1st day of Sept., 1914.

ALEXANDER T. BROWN.

Witnesses:
S. DAVIS,
J. GLAZIER.

Copies of this patent may be obtained for five cents each, by addressing the "Commissioner of Patents. Washington, D. C."